F. O. MATTHIESSEN.
Centrifugal Machine in Sugar Manufacture.
No. 166,999.  Patented Aug. 24, 1875.
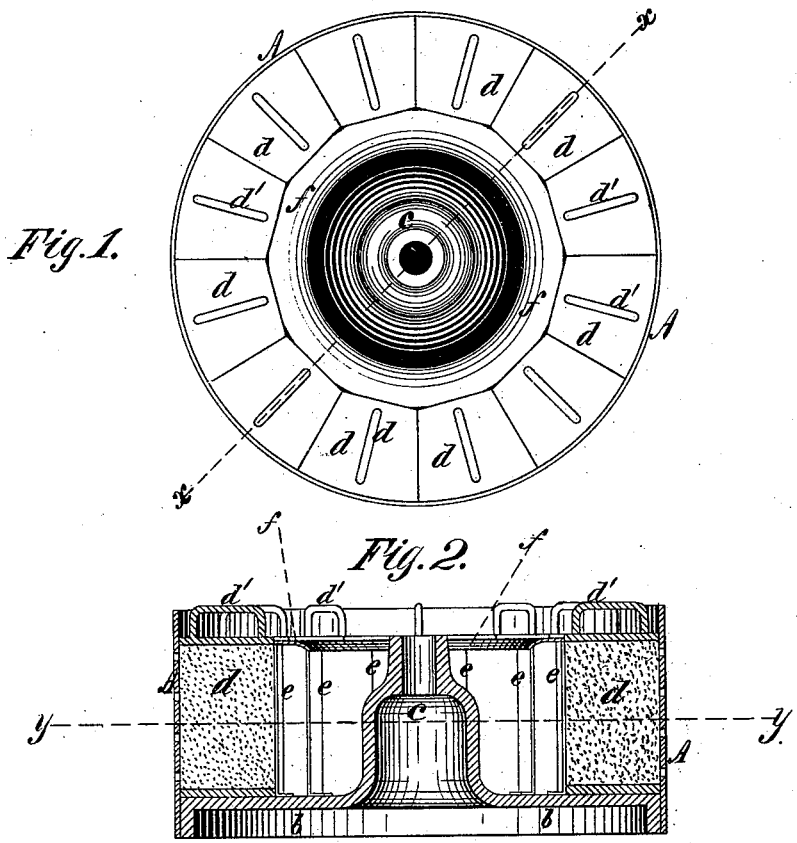
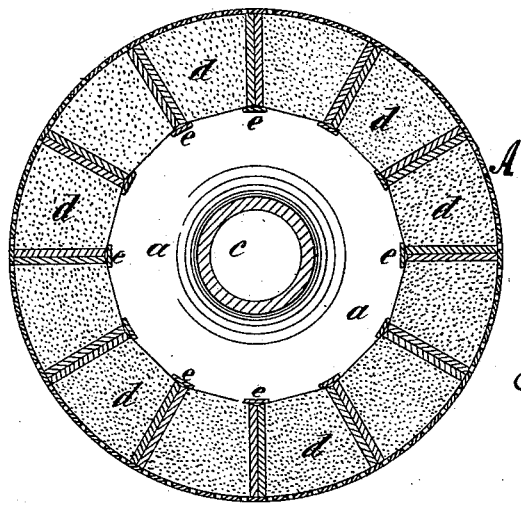
Witnesses:
E. H. Williams
Geo. W. Miatt
Inventor:
Franz O. Matthiessen
Per Edw. E. Quimby
atty

UNITED STATES PATENT OFFICE.

FRANZ O. MATTHIESSEN, OF IRVINGTON, NEW YORK.

IMPROVEMENT IN CENTRIFUGAL MACHINES IN SUGAR-MANUFACTURE.

Specification forming part of Letters Patent No. 166,999, dated August 24, 1875; application filed July 23, 1875.

CASE A.

*To all whom it may concern:*

Be it known that I, FRANZ O. MATTHIESSEN, of Irvington, New York, have invented a certain Improvement in Apparatus for Liquoring Hard Sugar, of which the following is a specification:

My improvement relates to a modification of the centrifugal machine heretofore used in manufacturing sugar, to adapt it to the purpose of liquoring hard sugar contained in the molds; and my invention consists of a perforated cylinder, conforming in dimensions to the perimeter formed by the exterior surfaces of a series of sugar-molds, annularly arranged with their sides in contact with each other, and supported interiorly by a prescribed number of pillars arranged within the cylinder, and bearing against the opposed edges of the adjoining molds. The pillars, in addition to forming the interior bearing for the molds, and preventing the escape of the treating-liquor through the joints between the sides of the molds, support a circular deflecting disk at the top of the space inside the molds, and this disk prevents the overflow of liquid contained in the interior of the mold, when the cylinder is rapidly rotated. The bottom of the cylinder is solid, but is provided with a central hub, by means of which it is supported upon the vertical shaft upon which it is revolved. The object of this structure is to facilitate the introduction of the treating-liquor, and to insure the uniform action upon all the sugar contained in the molds of treating-liquor introduced into the annular space within the molds while the centrifugal machine is in motion.

In operation, sufficient treating-liquor is introduced into the annular space within the molds to fully occupy the entire area of the outer wall of the annular chamber, when thrown up against it by the centrifugal force derived from the rotation of the cylinder. There is ample space between the inner edge of the deflecting disk and the hub for the introduction of the treating-liquor in the required quantity.

The accompanying drawings are as follows:

Figure 1 is a top view of my perforated cylinder, representing it as containing twelve sugar-molds. Fig. 2 is a section longitudinally through the axis of rotation on line $x\,x$, Fig. 1; and Fig. 3 is a section transverse to the axis of rotation through the line $y\,y$ on Fig. 2.

I have not deemed it necessary in my drawings to show the cylindrical chamber containing my perforated cylinder, &c., nor the shaft upon which the centrifugal machine revolves, nor the mechanism for driving it, as those are essential parts of centrifugal machines, the construction and operation of which are well known.

Referring to the drawings, A represents my perforated cylinder affixed to the periphery of the disk $b$, in the center of which is the hub $c$ to receive the shaft upon which the machine revolves. A series of twelve sugar-molds, $d\,d\,d\,d$, &c., are placed within the cylinder, and it will be seen that the sides of the molds are in close contact, and stand radially with reference to the cylinder. The inner or narrow ends of the molds are supported by twelve vertical pillars, each marked $e$. These pillars are firmly affixed to the top of the disk $b$, and their upper ends are affixed to and support the annular deflector $f$, the outer edge of which is polygonal to conform to the flat inner faces of the molds. The inner faces of the molds of sugar and the pillars form the outer boundary of the annular chamber $a$, the inner boundary of which is formed by the exterior of the hub $c$. The molds $d$, &c., are of the usual form of sugar-molds for containing hard sugar, and are provided with the handles $d'$ for convenience of transportation.

As will be seen, the molds may be separately introduced into or removed from the perforated cylinder.

The operation of my machine is as follows: The molds containing the sugar to be treated having been deposited in the cylinder, it is made to revolve rapidly, and the treating-liquor is introduced into the annular chamber $a$ all at once, if desired. The tendency of the treating-liquor to rise at the perimeter of the annular chamber, as the cylinder revolves, is resisted by the deflector $f$, and the body of treating-liquor is thus maintained in contact with all parts of the outer wall of the annular chamber *a* until it has been driven by centrifugal force radially outward through the sugar contained in the molds.

I claim as my invention, in a centrifugal sugar-liquoring apparatus, substantially such as described—

The perforated cylinder A, provided with the vertical pillars *e*, in combination with the deflecting flange *f*, substantially as and for the purpose set forth.

F. O. MATTHIESSEN.

Witnesses:
W. H. LYMAN,
F. M. QUIMBY.